(12) United States Patent
Lyon et al.

(10) Patent No.: US 8,464,410 B1
(45) Date of Patent: Jun. 18, 2013

(54) RACK TYPE PIPE FEEDER FOR A PIPE FUSION MACHINE

(75) Inventors: Timothy A. Lyon, Claremore, OK (US); Thomas D. Cravens, Pryor, OK (US); Bobby L. Murray, Broken Arrow, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 1270 days.

(21) Appl. No.: 11/518,052

(22) Filed: Sep. 8, 2006

(51) Int. Cl.
   *B23P 19/04* (2006.01)

(52) U.S. Cl.
   USPC .... 29/240; 248/354.1; 248/354.5; 248/354.7; 228/4.1; 228/44.5; 228/49.3; 254/10 R; 254/10C; 254/8 C; 254/2 C

(58) Field of Classification Search
   USPC .................. 248/354.1, 354.5, 354.7; 228/4.1, 228/44.5, 49.3; 211/60.1, 70.4, 151; 254/93 R, 254/89 H, 10 R, 10 C, 8 C, 2 C
   See application file for complete search history.

(56) References Cited

U.S. PATENT DOCUMENTS

| | | | | |
|---|---|---|---|---|
| 2,436,499 A * | 2/1948 | Williams | ...................... | 280/402 |
| 2,472,654 A * | 6/1949 | Engelke | .......................... | 248/49 |
| 2,705,119 A * | 3/1955 | Ingwer | ............................ | 248/55 |
| 2,733,330 A * | 1/1956 | Blewett | ......................... | 219/158 |
| 3,178,146 A * | 4/1965 | Goodale | ....................... | 248/352 |
| 3,254,776 A * | 6/1966 | Brown | ...................... | 414/22.61 |
| 3,313,505 A * | 4/1967 | Petrie | ............................ | 248/165 |
| 3,741,509 A * | 6/1973 | Kelly | ............................ | 248/171 |
| 3,792,783 A * | 2/1974 | Brown | ...................... | 414/22.62 |
| 3,902,699 A * | 9/1975 | Brackett | ..................... | 254/93 R |
| 3,916,500 A * | 11/1975 | Brown | ........................... | 29/240 |
| 4,520,981 A * | 6/1985 | Harrigan | ...................... | 248/413 |
| 4,697,446 A * | 10/1987 | Yamamoto et al. | ............ | 72/178 |
| 5,064,156 A * | 11/1991 | Handler et al. | ................ | 248/168 |
| 5,297,779 A * | 3/1994 | Collins et al. | ................... | 254/98 |
| 5,337,875 A * | 8/1994 | Lee | ............... | 193/35 R |
| 5,901,935 A * | 5/1999 | Lai | ............................. | 248/354.1 |
| 5,934,626 A * | 8/1999 | Collins, Jr. | ..................... | 248/132 |
| 6,461,255 B1 * | 10/2002 | Smith | ........................... | 473/417 |
| 6,575,213 B1 * | 6/2003 | Houk | ........................... | 144/287 |
| 6,612,533 B2 * | 9/2003 | Biles et al. | ................. | 248/354.1 |
| 6,719,515 B2 * | 4/2004 | Tolmon et al. | ............. | 414/22.54 |
| 6,988,719 B2 * | 1/2006 | Ursell et al. | ........... | 269/289 MR |
| 7,182,316 B2 * | 2/2007 | Sykes | ............................. | 254/85 |
| 7,240,885 B1 * | 7/2007 | Sullivan | ..................... | 248/354.1 |
| 7,240,886 B2 * | 7/2007 | Jones | ............................ | 248/405 |
| 2005/0189454 A1 * | 9/2005 | Smith et al. | .................... | 248/127 |
| 2006/0000462 A1 * | 1/2006 | Kurtz, Jr. | .......................... | 124/1 |

* cited by examiner

*Primary Examiner* — Terrell McKinnon
*Assistant Examiner* — Michael McDuffie
(74) *Attorney, Agent, or Firm* — Gables Gotwals

(57) ABSTRACT

A rack feeds sticks of pipe to a machine for serial fusion to the trailing end of a pipeline. Multiple independent spaced apart feeders support transverse bundles of sticks of pipe on beams. Legs which support the beams above the ground have jacks to vary the height and slope of the beams. The slope is set so that sticks tend to roll toward the lower front end of the beam where roller assemblies receive the sticks of pipe as they are manually rolled, one at a time, off the beams. All of the rack components are modular and interchangeably connectable so that the feeder can be quickly adapted for a variety of conditions and applications.

20 Claims, 4 Drawing Sheets

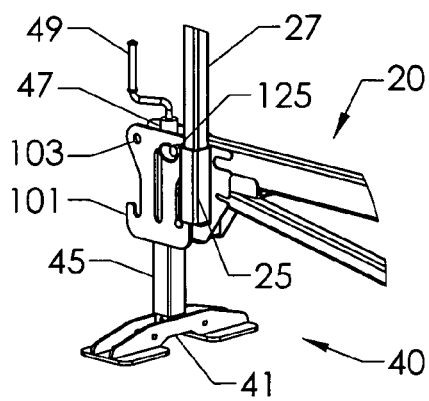
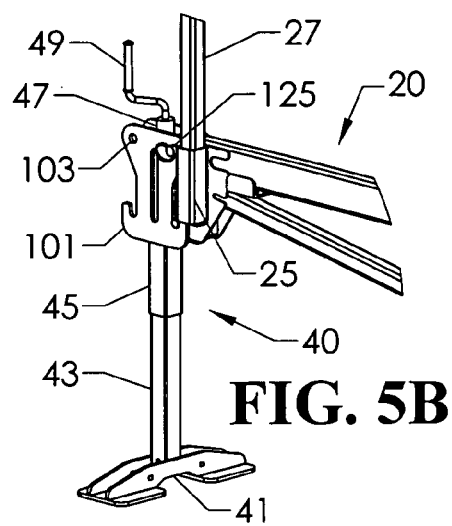
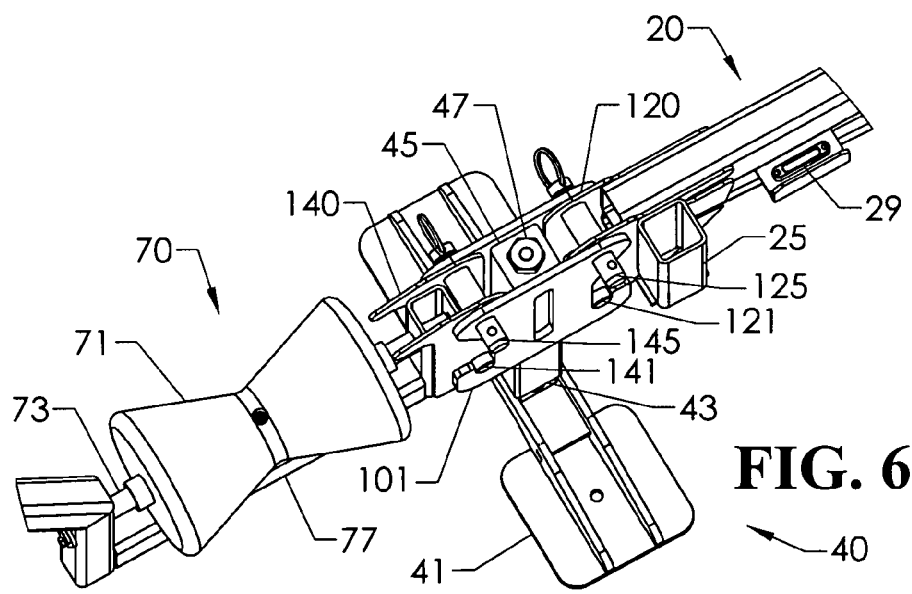

RACK TYPE PIPE FEEDER FOR A PIPE FUSION MACHINE

BACKGROUND OF THE INVENTION

This invention relates generally to high density polyethylene (HDPE) pipe fusion equipment and more particularly concerns equipment for feeding sticks of pipe into a machine for fusion to the trailing end of a pipeline.

Handling and staging sticks of pipe to be fed into a pipe fusion machine are presently labor intensive, time consuming tasks requiring use of expensive pipe loading, unloading and manipulating equipment and causing extensive downtime of the fusion machine while each stick of pipe is maneuvered into the machine and of the peripheral equipment while the fusion machine is in operation.

Typically, heavy construction equipment, such as telehandlers, backhoe loaders and fork trucks, are used to handle the sticks of pipe. Some pipe stands are available for use in the pipe fusion process, but they hold only one stick of pipe at a time and, despite use of the stand, other jobsite equipment is still required to load and position each and every stick of pipe in the fusion machine. More recently, a pipe storage rack has been combined with a single pipe stand, making it easier to load sticks of pipe onto the stand. It is not, however, an effective tool for manipulating sticks of pipe into a fusion machine. Furthermore, because of the pipe size, terrain contour and pipe loading limitations of this combination, there are many applications in which it is of little use at all.

It is, therefore, an object of this invention to provide a rack type pipe feeder for a pipe fusion machine which can stage multiple sticks of pipe. Another object of this invention is to provide a rack type pipe feeder for a pipe fusion machine which eliminates the need for dedicated heavy equipment to handle each individual stick of pipe. It is also an object of this invention to provide a rack type pipe feeder for a pipe fusion machine which requires heavy equipment only for the purpose of loading bundles of pipe from a truck onto the feeder. Still another object of this invention is to provide a rack type pipe feeder for a pipe fusion machine which is adjustable to accommodate variations in terrain contour. A further object of this invention is to provide a rack type pipe feeder for a pipe fusion machine which is usable with fusion machines of various sizes. Yet another object of this invention is to provide a rack type pipe feeder for a pipe fusion machine which usable with pipes of various sizes. An additional object of this invention is to provide a rack type pipe feeder for a pipe fusion machine which feeds pipe smoothly into a pipe fusion machine. And it is an object of this invention to provide a rack type pipe feeder for a pipe fusion machine which facilitates easy pulling of pipe through the jaws of the fusion machine into alignment for fusion with next stick of pipe.

SUMMARY OF THE INVENTION

In accordance with the invention, a rack type pipe feeder is provided for use in feeding sticks of pipe to a machine for serial fusion to the trailing end of a pipe. Multiple independent feeders are spaced apart to support bundles of sticks of pipe.

Each feeder has a beam for supporting transversely disposed sticks of pipe. Legs proximate front and rear ends of the beam support the beam above the ground. A jack is used to vary the height of one of the legs so as to set a beam slope at which the transverse sticks of pipe tend to roll toward the lower front end of the beam. Preferably, each leg has a jack. A roller assembly at the lower end of the beam has a roller aligned for rotation about an axis parallel to the beam. The roller is positioned to receive a stick of pipe as it rolls off the lower front end of the beam.

Preferably, the beam, the legs and the roller assemblies are modular and each leg has a coupling assembly which is co-operable with coupling assemblies on the beam and the roller assemblies to engage the legs to the beam and a roller assembly to either leg. In a preferred leg coupling assembly, an integral pair of J-hooks is aligned back-to-back on a vertical axis of symmetry. Each hook has an upper aperture through it. The coupling assemblies on the beam and roller assembly are substantially the same in configuration. They each have an extending fixed lower pin which can be seated in the bottom of its respective one of the J-hooks, an upper aperture oriented for alignment with the aperture of their respective one of the J-hooks when the lower pin is seated in its respective J-hook and a pin which is manually insertable into and withdrawable from aligned ones of the apertures to lock the legs to the beam and the roller assembly to the front leg.

Most preferably, each leg coupling assembly has a pair of spaced apart plates so that one end of the beam and one side of the roller assembly can be inserted between the plates on opposite sides of the leg. Each plate has an integral pair of apertured J-hooks aligned back-to-back on a vertical axis of symmetry. The beam and roller assembly coupling assemblies each have axially aligned pairs of fixed pins and upper apertures for engagement with their respective J-hooks. A single pin can be inserted through pairs of aligned apertures to lock its leg to its respective beam or roller assembly.

The modular beams may be trusses. A visible level may be fixed to the beam to facilitate setting the slope of the beam. A vertical post may be extended upwardly from a rear portion of the beam to limit rearward roll of sticks of pipe resting transversely on the beam. The post may be interchangeably insertable into one of two receptacles fixed at each end to the beam for receiving and securing the post in its upward orientation relative to the beam.

The roller of each roller assembly is preferably V-tapered to assure stability of the stick of pipe on the rollers. A member may be fixed to the roller assembly forward of the roller to block forward discharge of a stick of pipe from the roller. The blocking member may be a forwardly upwardly angled member. A lever may be pivotally engaged on the roller assembly to raise the roller supporting the stick of pipe, thereby facilitating further maneuverability of the stick of pipe into the fusion machine.

In operation, a plurality of independent pipe racks, usually three such racks, are aligned to support a traversing plurality of sticks of pipe. The heights of the racks are adjusted by use of the jacks to position their rollers to support a received stick of pipe at a level coordinated to the operation of the fusion machine and with the rack beams on slopes which extend upwardly from their rollers at angles at which said sticks of pipe tend to roll toward the rollers. At least one stick of pipe is transversely loaded on the racks. Preferably, loading is accomplished by resting one or more strapped bundles of sticks of pipe on the racks and then cutting the straps. A loaded stick of pipe is then manually urged to roll down the rack slopes onto the rollers. The end of the loaded stick of pipe closest to the fusion machine can be raised slightly, if necessary, using the lever, to properly align the stick with the fusion machine. The loaded stick can then be manually rolled on the rollers into the fusion machine. After the leading end of the manually rolled stick of pipe is fused to the trailing end of the pipeline, the pipeline can be pulled until the trailing end of the fused stick of pipe is positioned for fusion by the fusion machine to the next stick of pipe. The operation is then repeated beginning with the step of manually urging a loaded stick of pipe to roll down the rack slopes onto the rollers.

BRIEF DESCRIPTION OF THE DRAWINGS

Other objects and advantages of the invention will become apparent upon reading the following detailed description and upon reference to the drawings in which:

FIGS. 5A and 5B are perspective views of the junction of the beam and rear leg of the rack of FIG. 2 showing the leg in lowered and raised positions, respectively;

FIG. 6 is a perspective view of the junction of the beam, front leg and roller assembly of the rack of FIG. 2;

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

The Feeder

Figure 1:
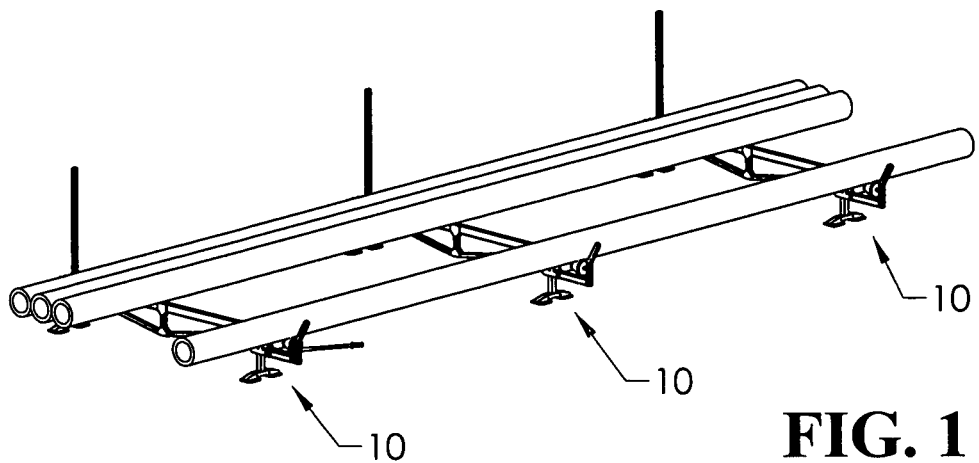
FIG. 1 is a perspective view of a multiple rack feeder supporting a load of sticks of pipe.

Turning to FIG. 1, a rack type pipe feeder 10 is provided for use in feeding sticks of pipe P to a machine (not shown) for serial fusion to the trailing end of a pipeline (not shown). In the use illustrated, three independent rack type feeders 10 are spaced apart to support bundles of the sticks of pipe P. One of the rack type feeders 10 illustrated in FIG. 2. The feeder 10 has a beam 20 for supporting the transversely disposed sticks of pipe P, legs 40 which support the beam 20 above the ground, a roller assembly 70 positioned to receive a stick of pipe P as it rolls off the beam 20 and coupling assemblies 100 to engage the legs 40 to the beam 20 and, depending on the configuration of the feeder 10, to a roller assembly 70. Preferably, the beam 20, the legs 40, the roller assemblies 70 and the couplings 100 are modular so that the feeder 10 has fewer different components and greater flexibility in configuration.

The Beam

Figure 2:
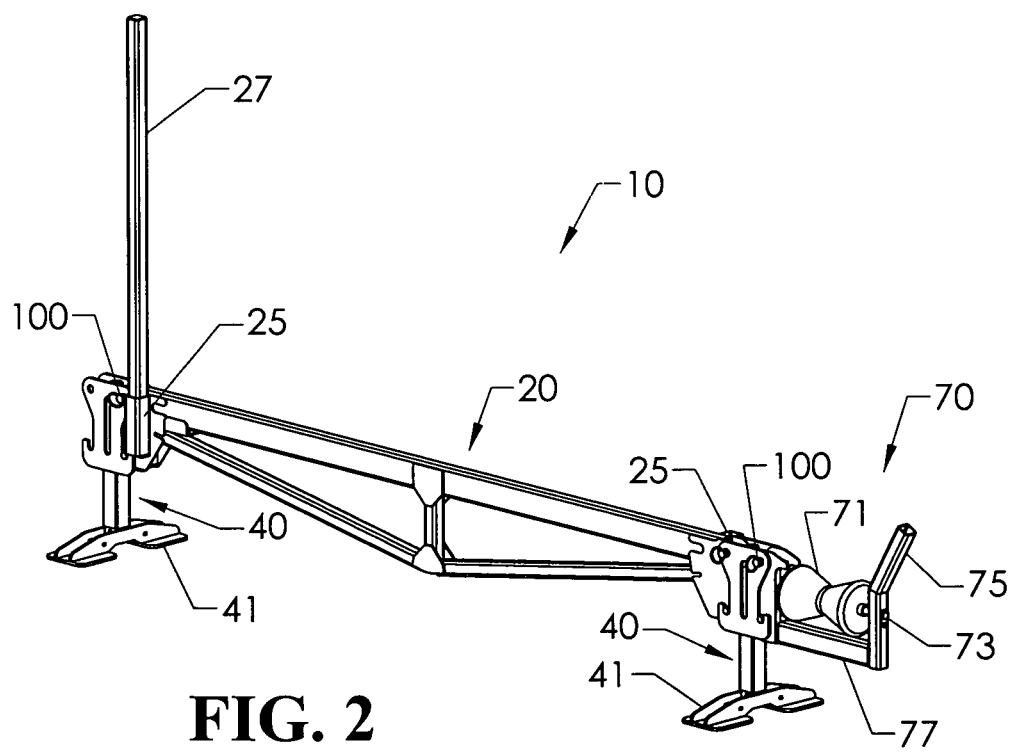
FIG. 2 is a perspective view of one of the racks of the feeder of FIG. 1.
Figure 3:
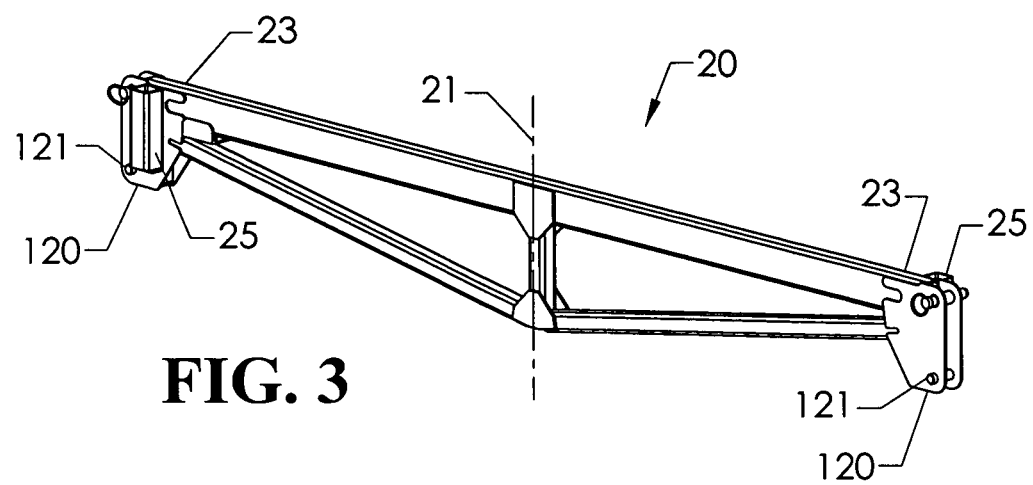
FIG. 3 is a perspective view of the beam of the rack of FIG. 1.

As seen in FIG. 3, the modular beams 20 are preferably trusses so as to afford a high strength-to-weight ratio. The beam 20 is oppositely symmetrical about its vertical center 21. That is, proximate the front and rear ends 23 of the beam 20, vertical tubular receptacles or sockets 25 are welded on opposite sides of the beam 20. As seen in FIG. 2, this permits a vertical post 27 to be extended upwardly from a selected end, or from each end, of the beam 20. Usually, the post 27 will be positioned to limit the rearwardmost roll of the sticks of pipe P on the beam 20 and prevent discharge of a stick of pipe P from the rear of the beam 20, as seen in FIG. 1.

The Legs

The legs 40 support the beam 20 above the ground. They are preferably positioned proximate front and rear ends 23 of the beam 20. As seen in FIGS. 5A and 5B, each leg 40 has a foot 41 and an upright 43. Preferably, each leg 40 has a telescoping upright extension 45 driven by a jack such as the screw jack 47 with a detachable handle 49, by a hydraulic jack or by a similar device. The jack 47 is used to vary the height of the leg 40 to orient the beam 20 on a slope at which the transverse sticks of pipe P tend to roll toward a lower front end 23 of the beam 20. Preferably, each leg 40 has a jack 47 so that the beam level will be easily coordinated with the levels of other beams 20 when multiple feeders 10 are positioned on irregular terrain. As best seen in FIG. 6, a visible level 29, such as a tubular spirit level, may be fixed to the beam 20 to facilitate setting the slope of the beam 20. The slope is set to incline the beam 20 slightly downwardly towards the roller assembly 70 to aid in loading the next stick of pipe P onto the roller assembly 70. The jacks 47 also facilitate raising and lowering the overall level of the beam 20 of the pipe stand to a proper height for feeding a stick of pipe P into the fusion machine (not shown). Thus the same feeder 10 can be used for different pipe diameters and for different sizes of fusion machines. The jacks 47 also permit the feeder 10 to accommodate varying terrain levels at the fusion machine and the racks.

The Roller Assembly

Looking at FIGS. 2 and 3, the lower front end 23 of the beam 20 has a roller assembly 70 with a roller 71 aligned for rotation on an axle 73 parallel to the beam 20. The roller 71 of each roller assembly 70 is preferably V-tapered, as shown, to assure stability of the stick of pipe P on the roller 71. A member 75 may be fixed to the roller assembly 70 forward of the roller 71 to block forward discharge of a stick of pipe P from the roller 71. The blocking member 75 may, as shown, be forwardly upwardly angled from a yoke 77 supporting the roller axle 73. Cast aluminum pipe rollers 71 are preferred.

Figure 7A:
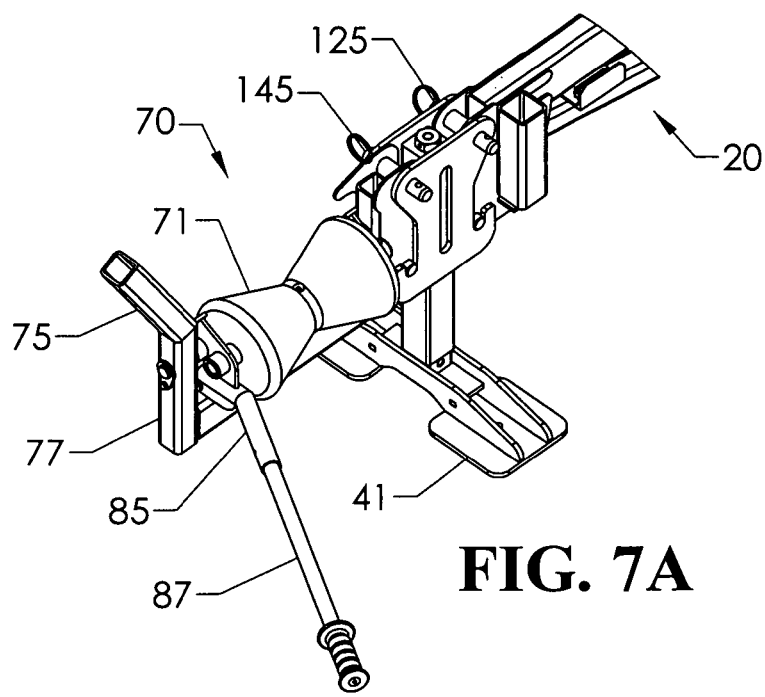
FIG. 7A is a perspective view of a roller assembly lift mechanism.
Figure 7B:
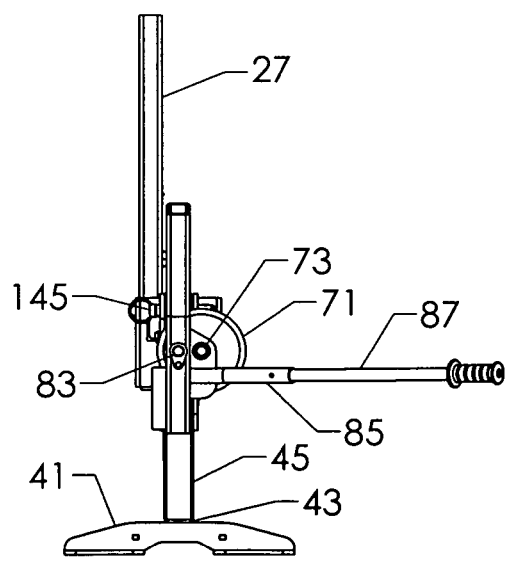
FIGS. 7B and 7C are front elevation views illustrating the normal and lift positions of the mechanism of FIG. 7A.
Figure 7C:
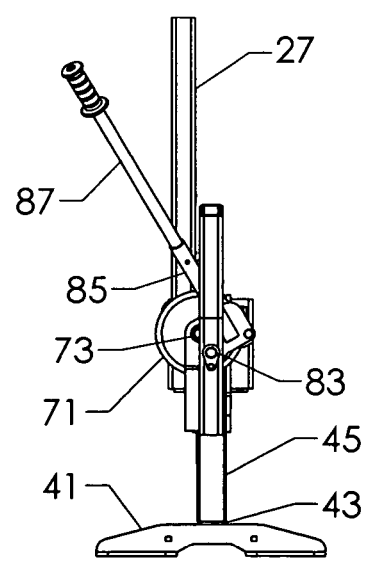

As seen in FIGS. 7A-7C, the roller assembly 70 of the feeder 10 closest to the fusion machine (not shown) may be specially adapted to facilitate feeding the leading end of the stick of pipe P into the machine. This is accomplished by mounting the roller axle 73 eccentrically from the yoke 77 which rotates on a split axle 83. An L-shaped lever 85 is fixed to the split axle 83 and a handle 87 is insertable into the lever 85. As best seen in FIG. 7A, it is preferred to employ two levers 85, one to the front and one to the rear of the roller 71. With the roller axle 73 in a normal eccentric position to the right of the split axle 83 as shown in FIG. 7B, rotation of the handle 87 in a counter-clockwise direction rotates the roller axle 73 about the split axle 83 arcuately upwardly and to the left, slightly raising the leading end of the stick of pipe (not shown) above the fusion machine jaw serrations so that the stick of pipe P can be easily pulled through jaws for proper alignment for next fusion. The over center style lift mechanism affords an approximately 14:1 mechanical lifting advantage with the handle 87 installed. Alternatively, other types of mechanical linkages and/or cams can be used to position the lead end of the stick of pipe P in relation to the fusion machine.

The Couplings

Figure 4:
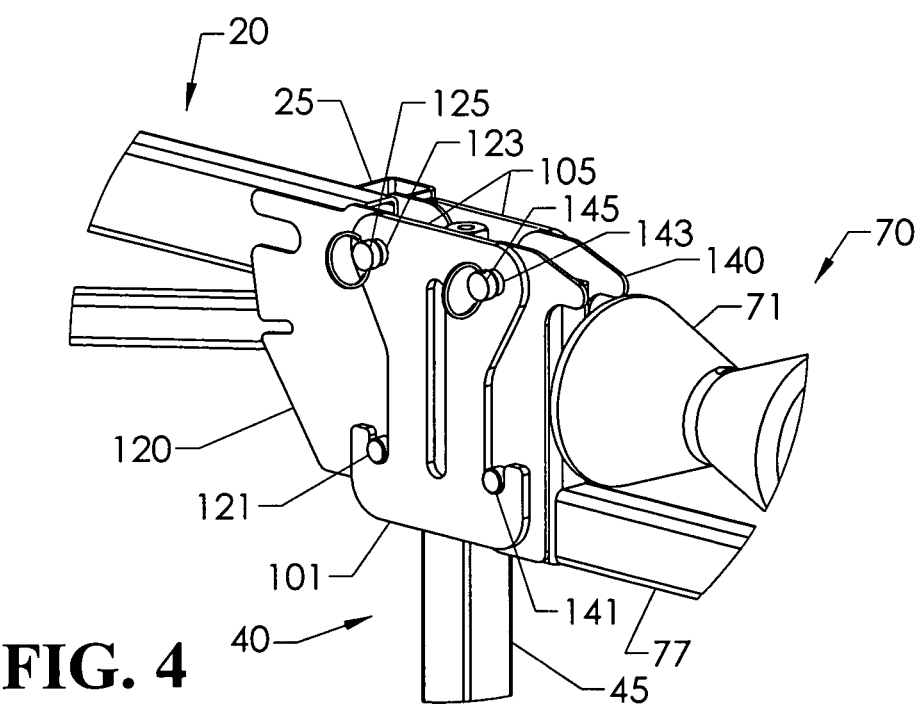
FIG. 4 is a perspective view of the junction of the beam, front leg and roller assembly of the rack of FIG. 2.

As best seen in FIGS. 4-6, a preferred leg coupling assembly 100 has an integral pair of J-hooks 101 aligned back-to-back on a vertical axis of symmetry. Each hook 101 has an upper aperture 103 through it. The coupling assemblies 120 and 140 on the beam 20 and roller assembly 70 are substantially the same in configuration. They each have an extending fixed lower pin 121 or 141 which can be seated in the bottom of its respective one of the J-hooks 101, an upper aperture 123 or 143 oriented for alignment with the aperture 103 of their respective one of the J-hooks 101 when the lower pin 121 or 141 is seated in its respective J-hook 101 and a pin 125 or 145 which is manually insertable into and withdrawable from aligned ones of the apertures 103 and 123 or 143 to lock the leg 40 to the beam 20 and the roller assembly 70 to the front leg 40.

Most preferably and as shown, each leg coupling assembly 100 has a pair of spaced apart plates 105 so that one end of the beam 20 and one side of the roller assembly 70 can be inserted between the plates 105 on opposite sides of the leg 40. Each plate 105 has an integral pair of apertured J-hooks 101 aligned back-to-back on a vertical axis of symmetry. The beam and roller assembly coupling assemblies 120 and 140 each have axially aligned pairs of fixed pins 121 or 141 and upper apertures 123 or 143 for engagement with their respective J-hooks 101. A single pin 125 or 145 can be inserted through pairs of aligned apertures 103, 123 or 143, 123 or 143 and 103 to lock its leg 40 to its respective beam 20 or roller assembly 70.

Operation

Returning to FIG. 1, multiple independent feeders 10, usually three, are assembled with a roller assembly 70 at the front end of the beam 20 and a vertical post 27 at the rear end of the beam 20. The feeders 10 are aligned to support a traversing plurality of sticks of pipe P. The heights of the beams 20 are adjusted by use of the jacks 47 to position their rollers 71 to support a received stick of pipe P at a level coordinated to the operation of the fusion machine (not shown) and with the beams 20 on slopes which extend upwardly from their rollers 71 at angles at which said sticks of pipe P tend to roll toward the rollers 71. Preferably, loading is accomplished by resting one or more strapped bundles of sticks of pipe P on the beams 20 and then cutting the straps. A loaded stick of pipe P is then manually urged to roll down the beam slopes onto the rollers 71. The end of the loaded stick of pipe P closest to the fusion machine can be raised slightly, if necessary, using the lever 85 and handle 87, to raise the stick of pipe P above the level of the fusion machine. The raised stick of pipe P can be easily pushed into the fusion area of the machine and then lowered to the fusion machine height. After the leading end of the manually rolled stick of pipe P is fused to the trailing end of the pipeline, the pipeline can be pulled until the trailing end of the fused stick of pipe P is positioned for fusion by the fusion machine to the next stick of pipe P. The operation is then repeated beginning with the step of manually urging a loaded stick of pipe P to roll down the beam slopes onto the rollers 71.

Using the modular system herein described, multiple beams 20 can be serially connected by legs 40 to afford an extended length beam sloped from one end to the other. Furthermore, roller assemblies 70 can be connected at each end of such an extended beam so that a single beam system can be used to serve two separate fusion machines, one on either side of the feeder.

Thus, it is apparent that there has been provided, in accordance with the invention, a rack-type pipe feeder that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use in feeding sticks of pipe to a machine for fusion in serial alignment, a pipe rack comprising:
   a beam for supporting at least one stick of pipe disposed transversely thereon;
   legs for supporting said beam above ground;
   a jack for varying a height of one of said legs to set a slope of said beam at which said at least one stick of pipe tends to roll along said beam; and
   a roller assembly at one end of said beam, a roller of said roller assembly being aligned for rotation about an axis parallel to said beam and positioned to receive a stick of pipe rolling off said beam.

2. For use in feeding sticks of pipe to a machine for fusion in serial alignment, a pipe rack comprising:
   a beam for supporting at least one stick of pipe disposed transversely thereon;
   front and rear legs for supporting said beam above ground;
   a jack for varying a height of one of said legs to set a slope of said beam at which said at least one stick of pipe tends to roll toward said front leg; and
   a roller assembly on said front leg, a roller of said roller assembly being aligned for rotation about an axis parallel to said beam and positioned to receive a stick of pipe rolling off said beam.

3. For use in feeding sticks of pipe to a machine for fusion in serial alignment, a pipe rack comprising:
   a modular beam for supporting at least one stick of pipe disposed transversely thereon;
   modular legs, each said leg having means thereon co-operable with means on said beam for engaging its respective said leg, one on a front and one on a rear portion, to said beam to support said beam above ground, each said leg having a jack for varying its height to set a slope of said beam at which said at least one stick of pipe tends to roll toward said front leg; and
   a modular roller assembly having means thereon co-operable with said means on said front leg for engaging said roller assembly to said front leg with a roller of said roller assembly being aligned for rotation about an axis parallel to said beam and positioned to receive a stick of pipe rolling off said beam.

4. For use in feeding sticks of pipe to a machine for fusion in serial alignment, a pipe rack comprising:
   a modular beam for supporting at least one stick of pipe disposed transversely thereon;
   modular legs, each said leg having means thereon co-operable with means on said beam for engaging its respective said leg, one on a front and one on a rear portion, to said beam to support said beam above ground, each said leg having a jack for varying its height to set a slope of said beam at which said at least one stick of pipe tends to roll toward said front leg; and
   a modular roller assembly having means thereon co-operable with said means on said front leg for engaging said roller assembly to said front leg with a roller of said roller assembly being aligned for rotation about an axis parallel to said beam and positioned to receive a stick of pipe rolling off said beam,
      said means on each said leg comprising an integral pair of J-hooks aligned back-to-back on a vertical axis of symmetry, each said hook having an upper aperture therethrough; and said means on said beam and said means on said roller assembly each comprising:
  a lower pin extending therefrom and seatable in a bottom of a respective one of said J-hooks;
  an upper aperture oriented therein for alignment with said aperture of said respective on of said J-hooks when said lower pin is seated in said respective J-hook; and
  a pin, said pin manually insertable into and withdrawable from aligned ones of said apertures.

5. For use in feeding sticks of pipe to a machine for fusion in serial alignment, a pipe rack comprising:
  a modular beam for supporting at least one stick of pipe disposed transversely thereon;
  modular legs, each said leg having means thereon co-operable with means on said beam for engaging its respective said leg, one on a front and one on a rear portion, to said beam to support said beam above ground, each said leg having a jack for varying its height to set a slope of said beam at which said at least one stick of pipe tends to roll toward said front leg; and
  a modular roller assembly having means thereon co-operable with said means on said front leg for engaging said roller assembly to said front leg with a roller of said roller assembly being aligned for rotation about an axis parallel to said beam and positioned to receive a stick of pipe rolling off said beam,
  said means on each said leg comprising a pair of plates spaced apart to receive a portion of said beam and a portion of said roller assembly therebetween, each said plate comprising an integral pair of J-hooks aligned back-to-back on a vertical axis of symmetry, each said hook having an upper aperture therethrough; and
  said means on said beam and said means on said roller assembly each comprising:
    a pair of lower pins extending outwardly from opposite sides thereof, each said pin being seatable in a bottom of a respective one of said spaced-apart J-hooks;
    a pair of upper apertures in opposite sides thereof, each said upper aperture oriented therein for alignment with said aperture of said respective one of said J-hooks when said lower pin is seated in said respective J-hook; and
    a pair of pins, each said pin being manually insertable into and withdrawable from aligned ones of said apertures.

6. A pipe rack according to claim 3, said modular beam comprising a truss.

7. For use in feeding sticks of pipe to a machine for fusion in serial alignment, a pipe rack comprising:
  a modular beam for supporting at least one stick of pipe disposed transversely thereon;
  modular legs, each said leg having means thereon co-operable with means on said beam for engaging its respective said leg, one on a front and one on a rear portion, to said beam to support said beam above ground, each said leg having a jack for varying its height to set a slope of said beam at which said at least one stick of pipe tends to roll toward said front legs;
  a modular roller assembly having means thereon co-operable with said means on said front leg for engaging of said roller assembly to said front leg with a roller of said roller assembly being aligned for rotation about an axis parallel to said beam and positioned to receive a stick of pipe rolling off said beam; and
  a visible level fixed to said beam for assisting in setting said slope of said beam.

8. A pipe rack according to claim 3 further comprising a vertical post extending upwardly from a rear portion of said beam for limiting rearward roll of said sticks of pipe.

9. A pipe rack according to claim 3 further comprising a post and means proximate each end of said beam for receiving and securing said post in upward orientation relative to said beam to limit rearward roll of said sticks of pipe.

10. A pipe rack according to claim 3, said roller assembly further comprising means fixed to said assembly forward of said roller for blocking forward discharge of a stick of pipe from said roller.

11. A pipe rack according to claim 10, said blocking means comprising a forwardly upwardly angled member.

12. A pipe rack according to claim 3 further comprising means disposed on said roller assembly for raising said roller and a stick of pipe resting thereon.

13. For use in feeding sticks of pipe to a machine for fusion in serial alignment, a pipe rack comprising:
  a modular beam for supporting at least one stick of pipe disposed transversely thereon;
  modular legs, each said leg having means thereon co-operable with means on said beam for engaging its respective said leg, one on a front and one on a rear portion, to said beam to support said beams above ground, each said leg having a jack for varying its height to set a slope of said beam at which said at least one stick of pipe tends to roll toward said front leg;
  a modular roller assembly having means thereon co-operable with said means on said front leg for engaging said roller assembly to said front leg with a roller of said roller assembly being aligned for rotation about an axis parallel to said beam and positioned to receive a stick of pipe rolling off said beam; and
  a lever pivotally engagable on said roller assembly for raising said roller and a stick of pipe resting thereon.

14. A pipe rack according top claim 3, said roller being V-tapered.

15. A method for feeding sticks of pipe to a machine for fusion in serial alignment comprising the steps of:
  aligning a plurality of independent pipe supporting beams to support a traversing plurality of sticks of pipe, each beam having a roller at an end thereof for receiving an individual stick of pipe as the stick rolls off of the beams;
  adjusting the heights of the beams to position their rollers to support a received stick of pipe at a level coordinated to the operation of the fusion machine.

16. A method according to claim 15 further comprising the step of loading at least one stick of pipe transversely on the beams.

17. A method according to claim 16, said step of loading comprising the sub-steps of:
  resting a strapped bundle of sticks of pipe on the beams; and
  cutting the straps.

18. A method according to claim 16 further comprising the step of manually urging a loaded stick of pipe to roll along the beams onto the rollers.

19. A method according to claim 18 further comprising the step of raising an end of the loaded stick of pipe closest to the fusion machine slightly and manually rolling the stick on the rollers into the fusion machine.

20. A method according to claim 19 further comprising the steps of:
  fusing a leading end of the manually rolled stick of pipe to the trailing end of pipeline;

pulling the pipeline until the trailing end of the rolled stick of pipe is positioned for fusion by the fusion machine; and repeating the method beginning with the step of manually urging a loaded stick of pipe to roll along the beams onto the rollers.

* * * * *